(12) United States Patent
Bush et al.

(10) Patent No.: US 10,378,676 B2
(45) Date of Patent: Aug. 13, 2019

(54) SYSTEM, METHOD, AND APPARATUS FOR OPTIMIZING A TIMING OF A FLUSH VALVE

(71) Applicant: SDB IP Holdings, LLC, Oviedo, FL (US)

(72) Inventors: Shawn D. Bush, Winter Park, FL (US); Rock R. Allard, III, Oviedo, FL (US); Blaine Andersen, Maitland, FL (US); Christopher R. Harrison, Deltona, FL (US)

(73) Assignee: SDB IP Holdings, LLC, Oviedo, FL (US)

( * ) Notice: Subject to any disclaimer, the term of this patent is extended or adjusted under 35 U.S.C. 154(b) by 118 days.

(21) Appl. No.: 15/232,137

(22) Filed: Aug. 9, 2016

(65) Prior Publication Data

US 2017/0168508 A1   Jun. 15, 2017

Related U.S. Application Data

(60) Provisional application No. 62/267,472, filed on Dec. 15, 2015.

(51) Int. Cl.
*F16K 31/12*  (2006.01)
*F16K 37/00*  (2006.01)
(Continued)

(52) U.S. Cl.
CPC .......... *F16K 37/0091* (2013.01); *E03C 1/057* (2013.01); *E03D 5/105* (2013.01); *E03D 9/00* (2013.01); *F16K 31/0675* (2013.01); *G01F 1/00* (2013.01); *G05D 7/0635* (2013.01); *A47K 5/06* (2013.01); *A47K 10/00* (2013.01); *A47K 10/24* (2013.01); *E03C 1/02* (2013.01);
(Continued)

(58) Field of Classification Search
CPC .................. Y10T 137/776; Y10T 137/7761
See application file for complete search history.

(56) References Cited

U.S. PATENT DOCUMENTS 3,061,264 A  10/1962  Rupert
3,180,355 A  4/1965  Long
(Continued)

FOREIGN PATENT DOCUMENTS

JP  6159543 A  6/1994
JP  2007113352 A  5/2007
(Continued)

*Primary Examiner* — Robert K Arundale
(74) *Attorney, Agent, or Firm* — The Webb Law Firm

(57) ABSTRACT

A system for optimizing a timing of a flush valve is provided. The system includes a flush valve comprising a flow area and a solenoid configured to open the flush valve, at least one pressure sensor configured to measure a pressure in the flush valve, and at least one controller in communication with the at least one pressure sensor and the solenoid. The at least one controller is programmed or configured to control the solenoid to open the flush valve for a flush time in response to a flush request, measure a pressure in the flush valve to obtain at least one flush valve pressure, adjust the flush time based at least partially on the at least one flush valve pressure, resulting in an adjusted flush time, and control the solenoid to open the flush valve for the adjusted flush time in response to a flush request.

16 Claims, 10 Drawing Sheets

(51) Int. Cl.
  E03D 9/00 (2006.01)
  E03C 1/05 (2006.01)
  F16K 31/06 (2006.01)
  G05D 7/06 (2006.01)
  G01F 1/00 (2006.01)
  E03D 5/10 (2006.01)
  A47K 5/06 (2006.01)
  A47K 10/00 (2006.01)
  A47K 10/24 (2006.01)
  E03C 1/02 (2006.01)
  E03D 3/00 (2006.01)
  E03D 1/00 (2006.01)

(52) U.S. Cl.
  CPC ................ *E03D 1/00* (2013.01); *E03D 3/00* (2013.01); *Y10T 137/776* (2015.04); *Y10T 137/7761* (2015.04)

(56) References Cited

U.S. PATENT DOCUMENTS

| | | | |
|---|---|---|---|
| 3,282,556 A | 11/1966 | Hancook | |
| 3,987,529 A | 10/1976 | Nakagawa et al. | |
| 4,053,136 A | 10/1977 | Perl | |
| 4,226,259 A | 10/1980 | Szekely et al. | |
| 4,301,992 A | 11/1981 | Karbo | |
| 4,336,918 A | 6/1982 | Karbo | |
| 4,440,139 A | 4/1984 | Naito et al. | |
| 4,477,051 A | 10/1984 | Ben-Yehuda | |
| 4,623,118 A | 11/1986 | Kumar | |
| 4,672,692 A | 6/1987 | Savage | |
| 4,787,413 A | 11/1988 | Saggers | |
| 4,797,820 A | 1/1989 | Wilson et al. | |
| 4,893,645 A | 1/1990 | Augustinas et al. | |
| 5,125,621 A | 6/1992 | Parsons et al. | |
| 5,131,427 A | 7/1992 | Latza | |
| 5,155,870 A * | 10/1992 | Tsutsui | E03D 5/10 4/300 |
| 5,341,839 A | 8/1994 | Kobayshi et al. | |
| 5,438,714 A | 8/1995 | Shaw | |
| 5,551,664 A | 9/1996 | Boke | |
| 5,575,308 A | 11/1996 | Marandi | |
| 5,853,026 A | 12/1998 | Wiodarczyk et al. | |
| 6,109,851 A | 8/2000 | Bauer et al. | |
| 6,164,888 A | 12/2000 | Kocks | |
| 6,189,563 B1 | 2/2001 | Taylor | |
| 6,382,586 B1 | 5/2002 | Wilson et al. | |
| 6,557,580 B2 | 5/2003 | Lohde et al. | |
| 6,715,506 B1 | 4/2004 | Ikushima | |
| 7,121,556 B2 | 10/2006 | Barth et al. | |
| 7,156,363 B2 | 1/2007 | Parsons et al. | |
| 7,607,448 B2 | 10/2009 | Hawks, Jr. et al. | |
| 8,091,860 B2 | 1/2012 | Thompson et al. | |
| 9,389,157 B2 | 7/2016 | Bush | |
| 2002/0002425 A1 | 1/2002 | Dossey et al. | |
| 2002/0167220 A1 | 11/2002 | Cunkelman | |
| 2003/0010390 A1 | 1/2003 | Beck et al. | |
| 2003/0148018 A1 | 8/2003 | Hoffmann et al. | |
| 2005/0224118 A1 | 10/2005 | Tornay | |
| 2006/0076061 A1 | 4/2006 | Bush | |
| 2006/0076527 A1 | 4/2006 | Bush | |
| 2008/0188991 A1 | 8/2008 | Mulligan et al. | |
| 2014/0261783 A1* | 9/2014 | Bush | E03D 5/10 137/487 |
| 2014/0379145 A1 | 12/2014 | Allard et al. | |
| 2015/0337524 A1 | 11/2015 | Bush | |

FOREIGN PATENT DOCUMENTS

| | | |
|---|---|---|
| WO | 2009061857 A2 | 5/2009 |
| WO | 2014152362 A1 | 9/2014 |

* cited by examiner

SYSTEM, METHOD, AND APPARATUS FOR OPTIMIZING A TIMING OF A FLUSH VALVE

CROSS REFERENCE TO RELATED APPLICATION

This application claims the benefit of U.S. Provisional Application No. 62/267,472, filed Dec. 15, 2015, the entire disclosure of which is hereby incorporated by reference in its entirety.

BACKGROUND OF THE INVENTION

Field of the Invention

This invention relates generally to restroom appliances and, in one particular embodiment, to a system, method, and apparatus for optimizing a timing of a flush valve.

Technical Considerations

In most waste water systems, such as the flushing systems for urinals, commodes, and the like, the valves associated with these systems are prone to wear, leaks, and other maintenance issues. With continued or prolonged use over time, or as the internal components of the valve wear, it is not uncommon for these known flush valves to provide a different amount of water per flush than they were originally designed to provide. For example, a flush valve originally designed to provide 1.6 gallons per flush when new may eventually provide 2 or more gallons per flush due to valve component wear or use. For large applications, such as hospitals, prisons, stadiums, apartment buildings, and the like, this can lead to an increase in water usage and cost. Additionally, these known flush valves cannot compensate for variations in water pressure during the flushing cycle that can also affect the amount of water per flush the valve provides. In addition to valves, other restroom appliances wear with continued usage and require regular maintenance.

Therefore, it would be advantageous to provide a system, method, and apparatus that reduces or eliminates at least some of the problems associated with known restroom appliances.

SUMMARY OF THE INVENTION

According to a non-limiting embodiment of the present invention, provided is a system for optimizing a timing of a flush valve to provide a consistent flush volume, comprising: (a) a flush valve comprising a flow area and a solenoid configured to open the flush valve; (b) at least one pressure sensor configured to measure a pressure in the flush valve; and (c) at least one controller in communication with the at least one pressure sensor and the solenoid, the at least one controller programmed or configured to: (i) control the solenoid to open the flush valve for a flush time in response to a flush request; (ii) measure a pressure in the flush valve to obtain at least one flush valve pressure; (iii) adjust the flush time based at least partially on the at least one flush valve pressure, resulting in an adjusted flush time; and (iv) control the solenoid to open the flush valve for the adjusted flush time in response to a flush request.

In non-limiting embodiments, the flush time may be adjusted to the adjusted flush time based at least partially on a number of uses of the flush valve. Further, the at least one controller may be further programmed or configured to increment a counter each time the flush valve is flushed, wherein the number of uses is based on the counter. In some non-limiting embodiments, the at least one controller measures the pressure in the flush valve to obtain the at least one flush valve pressure by obtaining at least one static pressure prior to a flush of the flush valve and at least one dynamic pressure during a flush of the flush valve. The flush time may be adjusted to the adjusted flush time based at least partially on the at least one static pressure, the at least one dynamic pressure, and the flow area of the flush valve. The flush time may also be adjusted to the adjusted flush time based at least partially on a number of uses of the flush valve.

In non-limiting embodiments, the adjusted flush time is less than the flush time to provide a consistent flush after the flow area of the flush valve has worn with usage. Moreover, in non-limiting embodiments, the at least controller may be further programmed or configured to determine a water volume usage per flush, and determine the adjusted flush time based at least partially on the water volume usage per flush. The water volume usage per flush may be based at least partially on the at least one flush valve pressure and a number of uses of the flush valve.

According to another non-limiting embodiment of the present invention, provided is a flush valve controller for optimizing a timing of a flush valve to provide a consistent flush volume, the flush valve controller configured to execute program instructions stored thereon or in communication therewith that cause the flush valve controller to: receive, from a pressure sensor disposed in the flush valve, at least one flush valve pressure within the flush valve; control a solenoid disposed in the flush valve to cause the flush valve to open for a flush time; adjust the flush time based at least partially on the at least one flush valve pressure, resulting in an adjusted flush time; and control the solenoid disposed in the flush valve to cause the flush valve to open for the adjusted flush time.

In non-limiting embodiments of the flush valve controller, the flush time may be adjusted to the adjusted flush time based at least partially on a number of uses of the flush valve. Further, in non-limiting embodiments the flush valve controller may be further programmed or configured to: determine a water volume usage per flush, and determine the adjusted flush time based at least partially on the water volume usage per flush. The water volume usage per flush may be determined based at least partially on the at least one flush valve pressure and a number of uses of the flush valve.

In non-limiting embodiments of the flush valve controller, the at least one flush valve pressure within the flush valve that is received from the at least one pressure sensor comprises at least one static pressure prior to a flush of the flush valve and at least one dynamic pressure during the flush of the flush valve. The flush time may be adjusted to the adjusted flush time based at least partially on the at least one static pressure, the at least one dynamic pressure, and a flow area of the flush valve. The flush time may also be adjusted to the adjusted flush time based at least partially on a number of uses of the flush valve.

In non-limiting embodiments, the flush valve controller may comprise at least one controller disposed in the flush valve or at least one central controller in communication with a plurality of flush valves, and the flush valve controller may be further programmed or configured to store the at least one flush valve pressure in at least one data storage device.

According to a further non-limiting embodiment of the present invention, provided is a method for optimizing a timing of a flush valve to provide a consistent flush volume, the flush valve comprising a flow area, a solenoid configured to open the flush valve to provide a flush through the flow area, and at least one pressure sensor arranged in the flush valve, comprising: measuring at least one flush valve pressure within the flush valve from data received from the at least one pressure sensor; controlling the solenoid to cause the flush valve to open for a flush time; adjusting the first flush time based at least partially on the at least one flush valve pressure, resulting in an adjusted flush time; and controlling the solenoid to cause the flush valve to open for the adjusted flush time.

In non-limiting embodiments, the flush time may be adjusted to the adjusted flush time based at least partially on a number of uses of the flush valve. Further, measuring the at least one flush valve pressure may comprise obtaining, from the at least one pressure sensor, at least one static pressure prior to a flush of the flush valve and at least one dynamic pressure during a flush of the flush valve. The flush time may be adjusted to the adjusted flush time based at least partially on the at least one static pressure, the at least one dynamic pressure, and the flow area of the flush valve. The flush time may also be adjusted to the adjusted flush time based at least partially on a number of uses of the flush valve.

In non-limiting embodiments, the method may include the further steps of determining a water volume per usage of the at least one flush valve, and determining the adjusted flush time based at least partially on the water volume per usage.

According to a further non-limiting embodiment of the present invention, provided is a system for monitoring flush valves, comprising: a plurality of flush valves arranged in at least one restroom of a building, each flush valve of the plurality of flush valves comprising a communication device configured to transmit flush valve data; and at least one controller in communication with each flush valve of the plurality of flush valves, the at least one controller programmed or configured to: collect the flush valve data from each flush valve of the plurality of flush valves; and determine if a first flush valve of the plurality of flush valves is in need of servicing or replacement based at least partially by comparing flush valve data for the first flush valve with flush valve data for at least one other flush valve of the plurality of flush valves.

In non-limiting embodiments of the system for monitoring flush valves, each flush valve of the plurality of flush valves may comprise a pressure sensor, and the flush valve data of each flush valve of the plurality of flush valves may comprise a pressure associated with that flush valve. Moreover, the at least one controller may be further programmed or configured to determine that the first flush valve is in need of servicing or replacement by determining that a pressure associated with the first flush valve differs by more than a predefined tolerance from a value comprising at least one of the following: a pressure of the at least one other flush valve, an average of pressures of the plurality of flush valves or a subset of flush valves of the plurality of flush valves, a median pressure of the plurality of flush valves or a subset of flush valves of the plurality of flush valves, or any combination thereof.

In non-limiting embodiments of the system for monitoring flush valves, the at least one controller is programmed or configured to determine that the first flush valve is in need of servicing or replacement by determining that the flush valve is used less frequently than at least one of the following: the at least one other flush valve, an average number of uses of the plurality of flush valves or a subset of flush valves of the plurality of flush valves, a median number of uses of the plurality of flush valves or a subset of flush valves of the plurality of flush valves, or any combination thereof. In other non-limiting embodiments, the at least one controller may be programmed or configured to determine that the first flush valve is in need of servicing or replacement by determining that the flush valve is used less frequently than other restroom appliances in the restroom, the other restroom appliances comprising at least one of the following: a faucet, a hand dryer, a towel dispenser, a soap dispenser, or any combination thereof.

In non-limiting embodiments of the system for monitoring flush valves, the at least one controller may comprise a controller internal to the first flush valve and/or a central controller. In some non-limiting embodiments, each flush valve of the plurality of flush valves may comprise an individual controller, and the at least one controller may comprise at least one individual controller of at least one flush valve of the plurality of flush valves.

According to further non-limiting embodiment of the present invention, provided is a system for monitoring restroom appliances, comprising: a plurality of restroom appliances arranged in at least one restroom of a building, each restroom appliance of the plurality of restroom appliances comprising a communication device configured to transmit appliance data; and at least one controller in communication with each restroom appliance of the plurality of restroom appliances, the at least one controller programmed or configured to: receive the appliance data from each restroom appliance of the plurality of restroom appliances; and determine if a first restroom appliance of the plurality of restroom appliances is in need of servicing or replacement based at least partially by comparing appliance data for the first restroom appliance with appliance data for at least one other restroom appliance of the plurality of restroom appliances.

In non-limiting embodiments of the system for monitoring flush valves, the at least one controller may be programmed or configured to determine that the first restroom appliance is in need of servicing or replacement by determining that the first restroom appliance is used less frequently than other restroom appliances of the plurality of restroom appliances. Determining that the first restroom appliance is used less frequently than other restroom appliances may comprise determining that a number of uses of the first restroom appliance is less than, or less than by more than a predefined tolerance, at least one of the following: a number of uses of the at least one other restroom appliance, an average number of uses of the plurality of restroom appliances or a subset of restroom appliances of the plurality of restroom appliances, a median number of uses of the plurality of restroom appliances or a subset of restroom appliances of the plurality of restroom appliances, or any combination thereof.

In non-limiting embodiments of the system for monitoring flush valves, the plurality of restroom appliances may comprise at least one of the following: a flush valve, a faucet, a hand dryer, a towel dispenser, a soap dispenser, or any combination thereof. Moreover, the at least one controller may comprise at least one of the following: a controller internal to the first flush valve, a central controller, at least one controller of a plurality of controllers internal to each of the plurality of restroom appliances, or any combination thereof.

According to another non-limiting embodiment of the present invention, provided is a method for monitoring a plurality of restroom appliances arranged in a restroom, each restroom appliance of the plurality of restroom appliances comprising a communication device configured to transmit appliance data, comprising: collecting, with at least one controller, appliance data from each restroom appliance of the plurality of restroom appliances; comparing, with at least one controller, appliance data received from a first restroom appliance of the plurality of restroom appliances to appliance data received from at least one other restroom appliance of the plurality of restroom appliances; determining, with at least one controller, if the first restroom appliance is in need of servicing or replacement based at least partially on the comparison of appliance data; and in response to determining that the first restroom appliance is in need of servicing or replacement, generating, with at least one controller, a least one alert or message identifying the first restroom appliance data.

In non-limiting embodiments of the method for monitoring a plurality of restroom appliances arranged in a restroom, determining if the first restroom appliance is in need of servicing or replacement may comprise determining that the first restroom appliance is used less frequently than other restroom appliances of the plurality of restroom appliances. Moreover, determining that the first restroom appliance is used less frequently than other restroom appliances may comprise determining that a number of uses of the first restroom appliance is less than, or less than by more than a predefined tolerance, at least one of the following: a number of uses of the at least one other restroom appliance, an average number of uses of the plurality of restroom appliances or a subset of restroom appliances of the plurality of restroom appliances, a median number of uses of the plurality of restroom appliances or a subset of restroom appliances of the plurality of restroom appliances, or any combination thereof.

In non-limiting embodiments of the method for monitoring a plurality of restroom appliances arranged in a restroom, the plurality of restroom appliances may comprise a plurality of flush valves, wherein each flush valve of the plurality of flush valves comprises a pressure sensor, and wherein the appliance data of each flush valve of the plurality of flush valves comprises a pressure of that flush valve.

In non-limiting embodiments of the method for monitoring a plurality of restroom appliances arranged in a restroom, determining if the first restroom appliance is in need of servicing or replacement may comprise determining that a pressure associated with the first restroom appliance differs by more than a predefined tolerance from a value comprising at least one of the following: a pressure of the at least one other restroom appliance, an average of pressures of the plurality of restroom appliances or a subset of restroom appliances of the plurality of restroom appliances, a median pressure of the plurality of restroom appliances or a subset of restroom appliances of the plurality of restroom appliances, or any combination thereof. Moreover, determining that the pressure associated with the first flush valve differs by more than the predefined threshold from the value may comprise determining that the pressure associated with the first flush valve is less than the value by at least the predefined tolerance.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

Figure 1:
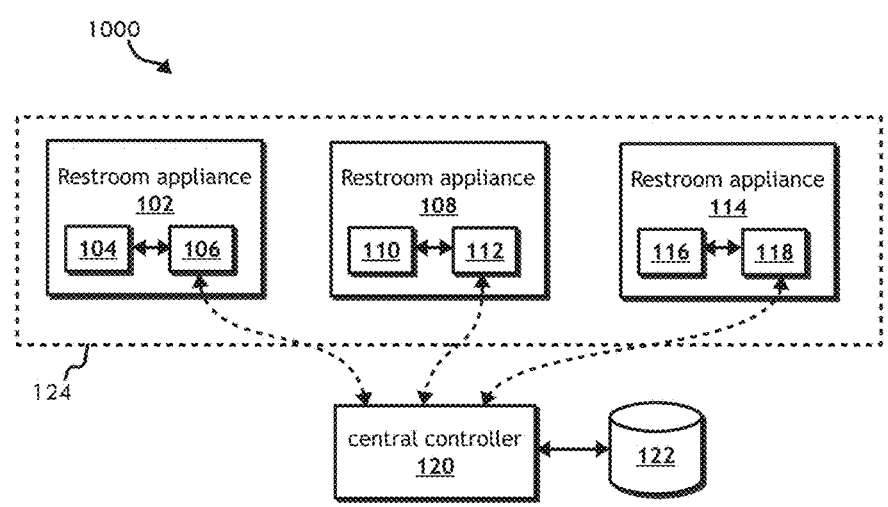
FIG. 1 is a schematic diagram for a system for monitoring restroom appliances according to the principles of the present invention.

As used herein, spatial or directional terms, such as "up", "down", "above", "below", "top", "bottom", and the like, relate to the invention as it is shown in the drawing figures. However, it is to be understood that the invention can assume various alternative orientations and, accordingly, such terms are not to be considered as limiting. Further, all numbers expressing dimensions, physical characteristics, processing parameters, quantities of ingredients, reaction conditions, and the like used in the specification and claims are to be understood as being modified in all instances by the term "about". Accordingly, unless indicated to the contrary, the numerical values set forth in the following specification and claims are approximations that can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.1, 3.5 to 7.8, 5.5 to 10, etc. All references referred to herein, such as but not limited to issued patents and published applications, are to be understood to be incorporated by reference in their entirety. The term "mechanical relief" refers to a relief device or system that does not require electricity or electrical power to function in a pressure relieving capacity. The term "electronic relief" refers to a relief device or system that utilizes electricity or electrical power to function in a pressure relieving capacity.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, and/or routed between the first and second unit or component. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be appreciated that various types of restroom appliances may be used in connection with the present invention. The term "restroom appliance" may refer to, for example, one or more valves (flush valves, faucet valves, shower valves, etc.), paper towel or toilet paper dispensers, toilet paper holders, hand dryers, soap dispensers, and/or other like devices and/or components thereof used in a restroom environment. In some non-limiting embodiments, the restroom appliances may include flush valves. U.S. Patent Application Publication No. 2015/0013432, entitled "Method of Monitoring Wear in a Diaphragm Valve Using Pressure Detection", the disclosure of which is hereby incorporated by reference in its entirety, describes valves that may be used in connection with the present invention, although it will be appreciated that various other types of valves, plumbing equipment, restroom appliances, and arrangements may be used in connection with embodiments of the present invention.

Referring now to FIG. 1, a system 1000 for monitoring restroom appliances is shown according to a non-limiting embodiment. As shown, restroom appliances 102, 108, 114 are arranged in a room 124. Each restroom appliance includes a respective controller 104, 110, 116 and a communication device 106, 112, 118. However, it will be appreciated that one or more restroom appliances 102, 108, 114 may share a common controller and/or communication device. In the embodiment shown in FIG. 1, the restroom appliances are arranged in a restroom 124 but it will be appreciated that the appliances may also be arranged in multiple restrooms of one or more buildings. The controllers 104, 110, 116 may include any suitable computing device, such as a microprocessor, CPU, and/or the like. The communication devices 106, 112, 118 may include any device capable of transmitting and/or receiving data such as, but not limited to, a wireless network adapter, Bluetooth® adapter, Ethernet adapter, radio transceiver, and/or any other wired or wireless mechanism for communicating data.

With continued reference to FIG. 1, the system 1000 also includes a central controller 120 and a central data storage device 122. The central controller 120 may be central to a particular restroom 124, a group of restrooms in a building, or even one or more buildings. The central controller 120 is in communication with each of the communication devices 106, 112, 118 via another communication device (not shown) associated with the central controller 120. In this manner, the central controller 120 collects appliance data from each of the restroom appliances 102, 108, 114 and stores it in the central data storage device 122. The central data storage device 122 may include any memory device capable of storing data in one or more data structures such as, for example, one or more hard drives having one or more databases stored thereon. The appliance data may include, for example, pressure data (e.g., an internal water pressure before, during, or after usage of the appliance), usage data (e.g., a number of uses over a period of time), a water usage (e.g., an amount of water per usage or over a period of time), and/or any other data relating to the restroom appliances 102, 108, 114. The appliance data may be transmitted upon each usage of a restroom appliance or in batches, and may represent discrete usage information or aggregate (e.g., average or median) usage information.

Figure 2:
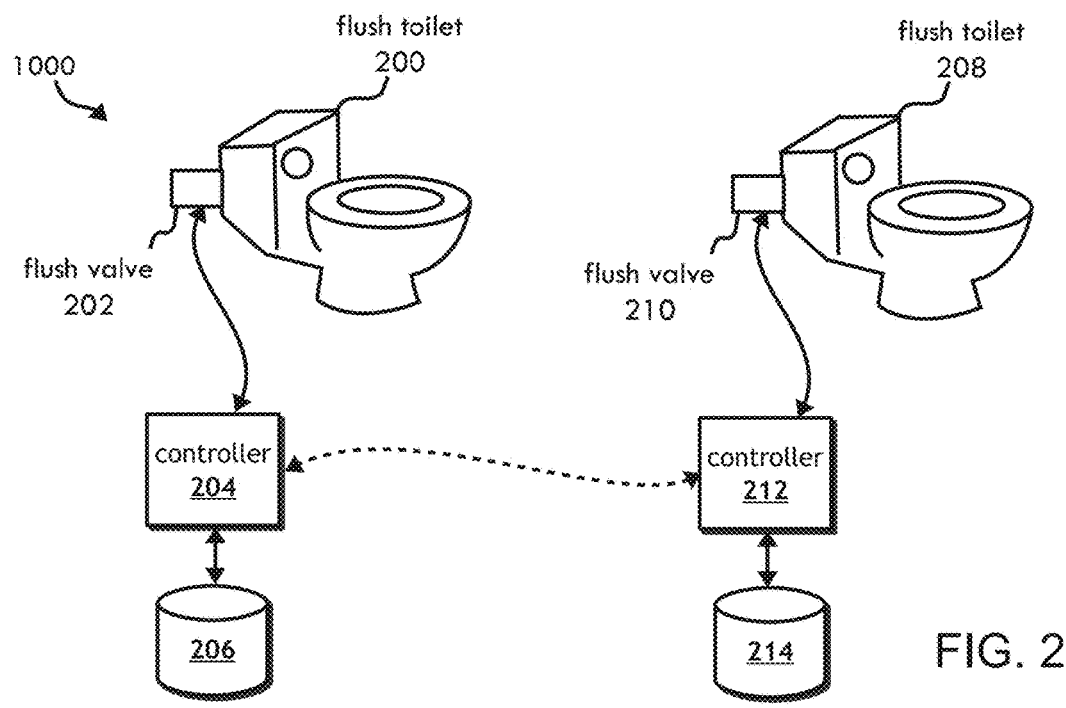
FIG. 2 is another schematic diagram for a system for monitoring restroom appliances according to the principles of the present invention.

Referring now to FIG. 2, a system 1000 for monitoring restroom appliances is shown according to another non-limiting embodiment. Here, the restroom appliances include flush valves 202, 210. Each flush valve 202, 210 of the system 1000 is associated with a flush toilet 200, 208. The flush valves 202, 210 are each controlled by a respective controller 204, 212. It will appreciated that each controller 204, 212 may also control one or more flush valves of other restroom appliances, and that, in some examples, a single controller 204 may be used. The controller 204 may be located directly in or on the valve 202 or at some other location (e.g., in a chase area, behind an appliance or wall, and/or the like). The controller 204 is in communication with a data storage device 206 to store detected water pressures and other appliance data. It will be appreciated that, in some examples, the data storage device 206 may be internal or external to the controller 204 and local or remote to the controller 204. In a preferred and non-limiting embodiment, each flush valve 202, 210 has its own controller 204, 212 and data storage device 206, 214. However, in other non-limiting embodiments and as described elsewhere herein, a central controller and/or a central data storage device common to multiple flush valves may also be used.

Still referring to FIG. 2, the controller 204 is in communication with the controller 212 for another flush valve 210 installed in the same restroom, facility, or region thereof. The controllers 204, 212 may also be in communication with other controllers (not shown) for several other restroom appliances in a given area, facility, or portion thereof. It will be appreciated that all restroom appliances in a restroom, part of a room, group of rooms, building, or region may be in communication with one another. In this manner, the controller 204 may determine the water pressure after operation of the flush valve 202 and compare it to a previous water pressure stored in the data storage device 206. If the determined water pressure is less than the previous water pressure, or if the difference between the two pressures is greater than a predefined threshold, the controller 204 may then obtain a water pressure stored in the data storage device 214 associated with another controller 212. In this manner, the water pressure of another flush valve 210 can be compared to the water pressure of the flush valve 202 to determine if an unexpected decrease in water pressure is specific to the flush valve 202 or due to some other problem affecting other flush valves 210 in the same facility. The previous pressure may include, for example, one or more pressures for a new flush valve kit. The pressures for a new flush valve kit may be in the form of a pressure profile curve representing water pressure over a time period to effectuate a desired flush volume (e.g., represented by the area under the curve). As the flush valve wears, the pressure profile curve will change (e.g., more time required at a lower pressure to achieve the same flush volume), indicating that the flush valve is in need of repair or replacement.

In non-limiting embodiments, and with continued reference to FIG. 2, a controller 204 for a particular valve 202 may poll the pressures of other flush valves 210 or restroom appliances to determine if the valve 202 is faulty. This polling may occur in response to a determination that a detected pressure of the valve 202 is less than a previous detected pressure of the same valve 202 or may occur regardless of what the detected pressure is. For example, if the pressure of the valve 202 is detected to be 45 PSI, one or more flush valves 210 in proximity to the valve 202 may be polled for comparison. If the pressure(s) of one or more proximate flush valves 210 is 60 PSI, then it can be determined that the valve 202 is faulty. Likewise, if the pressure(s) of one or more proximate flush valves 210 is also 45 PSI, or within a predefined tolerance range from 45 PSI, it can be determined that the valve 202 is not faulty.

Figure 3:
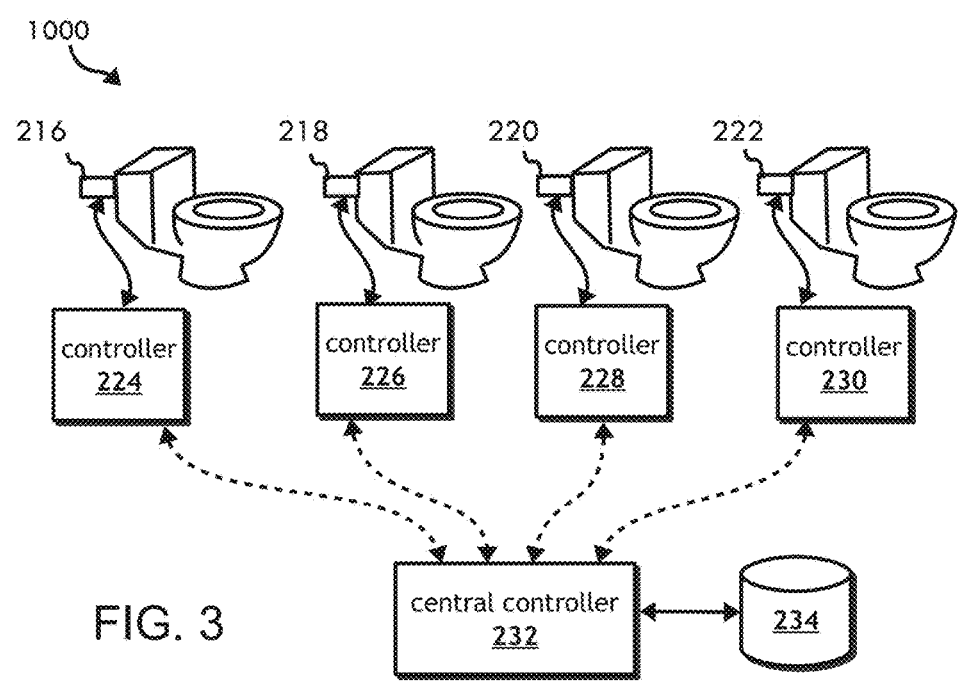
FIG. 3 is a further schematic diagram for another system for monitoring restroom appliances according to the principles of the present invention.

Referring now to FIG. 3, a system 1000 for monitoring restroom appliances is shown according to another non-limiting embodiment. In this embodiment, a plurality of restroom appliances (e.g., flush valves) 216, 218, 220, 222 each have associated controllers 224, 226, 228, 230. In this example, the controllers 224, 226, 228, 230 are in communication with a central controller 232, such as a computer system, server, or other type of data processor. The central controller 232 may be located local or remote to the controllers 224, 226, 228, 230 and may be in communication with a central data storage device 234. It will be appreciated that, as shown in FIG. 2, the controllers 204, 212 may also be in communication with one another directly.

With continued reference to FIG. 3, in operation, the controllers 224, 226, 228, 230 communicate the water pressures detected within the respective flush valves 216, 218, 220, 222 to the central controller 232, and the water pressures are then stored in the central data storage device 234. In this manner, a particular controller 224 may receive a water pressure of any other flush valve 218, 220, 222 to compare to the water pressure of its respective flush valve 216. For example, if the water pressure for the flush valve 216 is less than a previous water pressure, or if the difference between the two pressures is greater than a predefined tolerance (e.g., n PSI), the controller 224 may then receive one or more water pressures stored in the central data storage device 234 for comparison. An average or median of water pressures stored in the central data storage device 234 may be calculated and compared to the water pressure of the flush valve 216 to determine if an unexpected change in water pressure is specific to the flush valve 216 or due to some other problem that may affect other flush valves 218, 220, 222 in the same facility (e.g., a building-wide pressure drop).

The valves used in connection with the present invention may have pressure monitoring capabilities such as those described by U.S. Patent Application Publication No. 2015/0013432, entitled "Method of Monitoring Wear in a Diaphragm Valve Using Pressure Detection", the disclosure of which is hereby incorporated by reference in its entirety. For example, the valves may include a pressure transducer that continually monitors a fluid pressure within the valve. The pressure transducer may also monitor the pressure at specific times, such as when the actuator is activated, when the valve opens or closes, or at predefined intervals. When the actuator is activated or at some other point during usage of a valve, a controller may send a signal to the transducer to sense the static fluid pressure. Based upon this static pressure, a flush time (in some examples, a solenoid activation time) is calculated to achieve a desired flush volume. The transducer may remain powered during the flush to monitor the dynamic fluid pressure and to adjust the flush time. Moreover, the controller may be programmed to supply power to the pressure transducer at intermittent time periods, such as every 10 minutes, to intermittently monitor the internal pressure within the valve.

The pressure monitoring function of the transducer may be utilized as a maintenance function for the valve. For example, the internal components of diaphragm valves typically wear over time, which can result in prolonged fluid flow therethrough, wasting substantial amounts of water. Often, such wear causes the valve to take a longer period of time in order to reseal the diaphragm based upon the time required to build up water pressure within the valve at the inlet side of the diaphragm. The controller in communication with the pressure transducer may be programmed to detect the fluid pressure within the valve after a certain period of time after a normal flush is requested and effected. The typical range of time required to achieve the water pressure necessary to effect resealing of the diaphragm and closure of the valve is known based on normal operation of the valve. A comparison of the water pressure after a normal flush at the known time period can provide information regarding the wear of the valve. For example, if the water pressure detected after the predetermined time period is lower than the typical water pressure value as known, the valve may require servicing or replacement. A signal including this information may be transmitted to a central processing unit, which may then generate an alert to notify the maintenance staff that servicing is required.

In non-limiting embodiments, the valve may be determined to be in need of service or replacement by detecting the water pressure and comparing it to one or more values. For example, a controller may be associated with one or more flush valves. The controller may be in communication with a pressure transducer that is located within the flush valve and configured to detect a water pressure internal to the valve after operation. In some non-limiting embodiments, the pressure may be detected when a specified period of time elapses after operation of the flush valve. As an example, this period of time may be a time which, during normal operation (e.g., when the valve is new or is otherwise in acceptable working condition), results in the flush valve being resealed. It will be appreciated that such a period of time may be a preset value or, in other instances, determined dynamically from historical data, time periods associated with past operation of the valve, time periods associated with other valves, and/or the like.

In non-limiting embodiments, the value that is compared to the detected pressure may be determined and/or identified in various ways. For example, a comparison pressure value may be detected from the same flush valve before activation of the valve, when the valve is activated, and/or after a previous activation of the flush valve and completion of the flush cycle. Further, as explained herein, the comparison pressure value may also be a pressure of one or more other flush valves, an average of pressures of one or more other flush valves, and/or the like. In some non-limiting examples, the comparison pressure may be based on a previous or historical pressure for a particular valve in addition to a pressure of one or more other valves. In such examples, the pressure values of the one or more other valves may be used to verify that a difference between a detected pressure of the valve and one or more previous pressures of the valve is not due to some external factor (e.g., a pressure drop affecting an entire building, facility, or portion thereof). The comparison pressure value may also be set by a user through a controller associated with the flush valve or through a remote device or interface in communication with the controller. For example, the comparison pressure may be set through a user interface of a central controller, through a controller local to the valve, and/or in various other ways. Further, as explained above, the comparison pressure may include a curve representing changes in pressure over a flush time period. The curve may be a profile for a new flush valve kit determined from initial pressure readings, or may be an expected profile for a flush valve having a particular number of uses or history.

In non-limiting embodiments, the valve may be determined to be faulty and in need of servicing or replacement if two or more detected pressures are less than one or more previous pressures for the valve or if the difference of two or more detected pressures is greater than a specified threshold. In these embodiments, false alarms and erroneous alerts can be avoided by waiting for at least one other comparison before determining if the valve is faulty. For example, if a first pressure is 60 PSI and the next detected pressure is 45 PSI, the drop in pressure could be determined to be an anomaly. Accordingly, in these non-limiting examples, a third pressure (or a predefined number of additional pressures) may be detected before determining that the valve is faulty. For example, if a third pressure is also 45 PSI, it may be determined that the valve is indeed faulty and that the second pressure of 45 PSI was not an anomaly. Likewise, if the third pressure is 60 PSI, it may be determined that the second pressure of 45 PSI was an anomaly and that the valve does not require servicing or replacement. Similarly, if a predefined number of additional pressures are also 45 PSI or less than 60 PSI, it may be determined that the valve is faulty.

Figure 4:
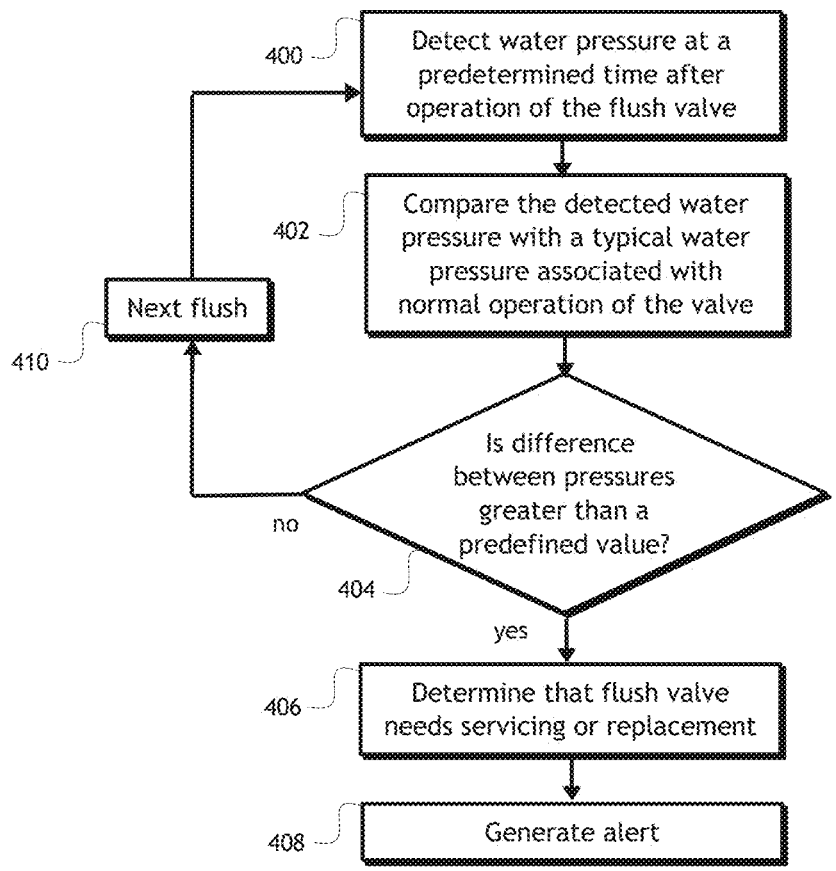
FIG. 4 is a flow diagram for a method of monitoring wear in a flush valve according to the principles of the present invention.

Referring now to FIG. 4, a method for determining that a flush valve needs to be serviced or replaced is shown according to a non-limiting embodiment. At a first step 400, a water pressure is detected within the flush valve at a predetermined time after the flush valve is operated. As explained above, the predetermined time may be preset in the system or determined in some other way prior to detecting the pressure. The water pressure may also be detected at any time prior to a subsequent operation of the flush valve. For example, the water pressure may be detected before activating the valve in response to receiving a command to activate the valve. After the water pressure is detected at the predetermined time, the pressure is compared with another water pressure value in a second step 402. As an example, the detected water pressure may be compared with a typical water pressure associated with normal (e.g., not faulty) operation of the valve. As explained above, other values may also be compared to the detected water pressure such as, for example, a previously measured water pressure for the flush valve, a pressure for another flush valve in the same facility as the flush valve, an average of pressures of a plurality of flush valves, and/or the like.

With continued reference to FIG. 4, the comparison of the detected water pressure with another water pressure at step 402 may result in a difference between the values of the respective pressures. At step 404, it is determined if the difference is greater than a threshold (or outside a predefined tolerance range) such as, but not limited to, a predefined value. If the difference between pressures does not exceed the threshold, or does not exceed the threshold by more than a tolerance amount, it may be determined that the valve is not faulty or that any leaking or pressure differential is minimal and the valve does not need to be serviced or replaced. It will be appreciated that, in other non-limiting embodiments, a tolerance or threshold may not be used and any difference in pressure may result or factor into a determination that a valve is faulty. If the difference does exceed the threshold, or if there is a difference between pressures, the method may proceed to step 406 at which it is determined that the flush valve needs to be serviced or replaced. At step 408, an alert may be sent. The alert may be in the form of an indicator light, email, phone call, text message, notification in a graphical user interface, record in a database, or by any other means. If there is no difference, or if the difference is not significant, the method may repeat after the next flush of the valve at step 410.

In non-limiting embodiments, and as described herein, one or more valves may share a common controller. In such examples, a pressure detected in one valve may be used to determine if another valve is faulty and in need of service or replacement. However, in other examples, such as the non-limiting embodiment shown in FIG. 1, different controllers may be used to operate a plurality of valves, and the respective controllers may be in communication with each other using various wired and wireless techniques and protocols. In further examples, the respective controllers may be in communication with a common central controller. In non-limiting embodiments, Bluetooth®, WiFi, near-field communication (NFC), and/or other wireless communication protocols may be used to communicate among controllers. Using pressure readings from other valves may help determine if a particular valve installed in the same facility is faulty, or if a difference in pressure is due to some other reason such as, for example, a pressure drop affecting the entire building or facility.

Referring again to FIG. 2, in non-limiting embodiments the valves 202, 210 may be in communication with each other through their respective controllers 204, 212 in several different configurations. Restroom appliance data may be shared between the valves 202, 210 directly or through a local and/or remote controller that receives and distributes the data. In this manner, the controllers of the valves can detect an error by comparing its data with data from other valves. For example, if there are six valves in an area, those six valves can be considered a group and one or more controllers of the valves can determine an anomaly or aberration (e.g., if one of the valves is not being used but the others are) indicating that the valve may be faulty or in need of service (e.g., clogged toilet, needs to be cleaned, out of toilet paper, etc.). In this manner, faults that are not able to be detected mechanically or electrically, such as the need for cleaning, toilet paper, or the like, can be determined based on a number of uses (or lack thereof) relative to other appliances.

Moreover, those skilled in the art will appreciate that numerous other devices used in a restroom, including but not limited to valves, hand dryers, paper towel dispensers, toilet paper holders, soap dispensers, and the like, may be made self-aware using the systems and methods described herein.

In this manner, each device, or a central processor, can compare data from the other similarly equipped devices and detect and report anomalies and aberrations that indicate faulty operation. For example, if the system determines that the valves are being used to flush but that the hand dryers and/or paper towel dispensers are not being used at a similar frequency, it can be determined that those appliances may need service or repair. Likewise, if there are multiple hand dryers and/or paper towel dispensers in a restroom and one or more of these appliances are used less frequently than the others, it may be determined that those appliances may need service or repair. It will be appreciated that various other comparisons between restroom appliance data for similar or different types of appliances may indicate the need for service or repair.

Referring again to FIG. 3, in a preferred and non-limiting embodiment, the system 1000 is used to gather information from various restroom appliances, and control and program such appliances and other devices (e.g., flush valves 216, 218, 220, 222 and/or controllers 224, 226, 228, 230) through a communication protocol. For example, the collected restroom appliance data may be stored in a data storage device 234 and processed with one or more algorithms and/or software routines to determine water consumption, a number of operations, when maintenance is required (e.g., batteries need replacing, device failure, etc.), pressure of the appliances, and other useful analytical information. This restroom appliance data may also be used to schedule preventative maintenance, service calls, order parts, and/or the like. In some non-limiting embodiments, such scheduling may be at least partially automated. As an example, paper towels may be automatically ordered based on a number of uses of one or more dispensers.

The restroom appliance data that may be gathered from the restroom appliances 216, 218, 220, 222 and/or controllers 224, 226, 228, 230 includes, but is not limited to, flush counts, pressure, light, RFID data, battery power, communication range, infrared (IR) pulse count, solenoid current, communication status/information, location, and/or mode (e.g., automatic, manual override, etc.). It will be appreciated that, in non-limiting embodiments, restroom appliance data may also include information sensed and/or collected concerning the environment in which an appliance is installed. Such environmental data may include, for example, ambient light levels (e.g., luminosity), sound levels, humidity, and/or the like, as detected by one or more sensors in a restroom.

In a preferred and non-limiting embodiment, the restroom appliance data comprises a number of uses (e.g., flushes) of a flush valve or other restroom appliance in a given period of time. For example, a programmatic counter could be incremented each time a flush valve is used since a previous replacement of the valve or a component thereof (e.g., a diaphragm). In this manner, preventative maintenance can be scheduled and performed prior to failure of the flush valve so that water is not continually running and being wasted. Replacements and repairs may be tracked by various means including, for example, RFID tags, barcodes, unique identifiers in one or more databases, or the like. By knowing and tracking battery voltage, it can also be determined if a battery is close to the end of its lifespan and the central controller 732, in response to such a determination, may alert staff for replacement. Alerts may be effectuated via email, text message, pop-up or push notifications, status lights, and/or the like.

Moreover, restroom appliance data can be used to configure and optimize restroom appliances. For example, using a detected pressure and the number of uses/flushes of a valve, the timing of the valve can be adjusted to optimize water consumption. For example, one or more algorithms may be used to determine water usage from the water pressure and the number of uses. This information can be used to limit or set a timing of the valve. Timing systems are described in U.S. patent application Ser. No. 14/309,246, entitled "Removable Time Adjusting Device, System, and Method for Adjusting an Electronic Plumbing Controller", the disclosure of which is hereby incorporated by reference in its entirety. The timing of a flush valve may be determined, for example, based at least partially on a static pressure before a flush, the flow area of the flush valve, and the dynamic pressure during the flush. In this manner, the flush time can be adjusted to provide a consistent amount of water per flush even if the building pressure fluctuates during the flush.

Referring back to FIG. 2, a system 1000 of flush toilets 200, 208 and associated controllers 204, 212 is shown according to a non-limiting embodiment. The flush valves 202, 210 each have, disposed therein, one or more pressure sensors (not shown) for measuring one or more pressures within one or more regions of the flush valve 202, 210 body. Pressure sensors may also be associated with one or more flush valves 202, 210 but located outside of the flush valve 202, 210 bodies, such as in a control stop or other plumbing apparatus connected to the flush valves 202, 210. The controllers 204, 212 are respectively programmed to cause the flush valve to operate (e.g., open or close) and to obtain measurements from the one or more pressure sensors. The controllers 204, 212 may be initially programmed to cause the flush valves 202, 210 to flush with a given flush time (e.g., 1.5 seconds). If flush valve 202 is used more than flush valve 210, for example, the flush valve 202 may have more wear. Thus, to provide a consistent flush volume it may be desirable to adjust the predefined flush time for one or more flush valves 202, 210. Such an adjustment may be made automatically upon determining that the pressure and/or amount of usage is within a tolerance of one or more predefined values. The flush times may be adjusted continuously or, in other examples, periodically at scheduled intervals. It will be appreciated that various arrangements are possible.

The flow area of a flush valve 202, 210 may include, for example, the flow area of a bypass hole in an upper chamber of the valve as described in U.S. Patent Application Publication No. 2015/0013432. As this flow area wears over time, it may cause the upper chamber to fill more quickly and therefore causes a shorter flush with less water. This can be seen based on the shut-off time from when the solenoid closes and the upper chamber fills to seal the valve. Thus, the number of flushes may also be used to determine a flush time because, as the valve is worn with multiple uses, the algorithm may be adjusted with respect to the flow area of the flush valve to provide a consistent flush. As an example, if a normal shut-off time is 1.5 seconds, and the flow area has worn to the point where the shut-off time is 1.0 second, the flush time can be adjusted by 0.5 seconds to provide a consistent flush. Conversely, if the bypass hole is not worn but the valve body is worn where water flows from the main into the valve, the water usage will increase (for example, 1.7 gallons rather than a desired 1.6 gallons).

The controller 204, 212 can determine that the dynamic pressure is lower than it has been historically and, in response to this determination, can adjust the flush time to a shorter flush time to compensate for the larger flow area to the fixture and maintain a decreased water usage. Accordingly, a flush time may be adjusted based upon one or more pressures in the valve, a usage amount of a flush valve, and/or any other restroom appliance data. As an example, an adjustment may be automatically made to a flush time in response to a programmatic counter reaching a predefined number of uses. Such a counter may be incremented each time the flush valve is operated, as indicated by actuation of an actuator, activation of a hands-free sensor, water pressure fluctuations, and/or the like. Thus, the number of uses may independently affect the flush time and, in other non-limiting examples, may be factored into an adjusted flush time along with one or more pressures obtained from one or more pressure sensors disposed in or associated with the flush valve.

In non-limiting embodiments, an aggregate pressure for an area may be used to control appliance and/or water usage. For example, by knowing an aggregate water pressure for a plumbing network, the activation of valves can be limited or staggered to ensure optimal pressure. With reference to FIG. 3 as an example, the pressure of a plurality of flush valves 216, 218, 220, 222 may be monitored in a restroom and used to control the timing of the flush valves. In such an example, if the water pressure for the restroom is low due to multiple uses, one or more controllers 224, 226, 228, 230, 232 may limit the flushing of other valves until the pressure is stabilized or until a predetermined period of time elapses. For example, if valves 216, 218, 220 are being used and the total water pressure available to all valves is low, use of valve 222 may be limited until the pressure is stabilized. The pressures may also be analyzed to determine trends and/or patterns based on one or more parameters such as, but not limited to, time, usage, and/or the like. By comparing detected pressures with trends and/or historical data, the system can determine if a valve is running or leaking, as examples, and generate an alert to the emergency or need for repair.

With reference to FIG. 3, in a preferred and non-limiting embodiment, the restroom appliance data received from the plurality of flush valves 216, 218, 220, 222 may include solenoid currents for each of the flush valves, and the controller 232 may analyze the solenoid currents to determine trends and patterns of such currents. Using this current information, the controller 232 can be determined whether a solenoid is failing. For example, if past currents are compared to an actual current, it may be determined based on this comparison that the current is increasing. Based on the increasing current trend, it can be determined that the solenoid is or may be failing. For example, if the trend of detected currents shows a significant increase in current, it can be determined that the solenoid did not open and no flush occurred. Current increases as power is supplied to the solenoid coil and a small "dip" in the current trend represents a moment when the plunger moves off of the seat of the valve. The system can therefore analyze historic current trends to determine if there is an error or fault with the solenoid or the plunger and that service or replacement is needed. For example, if at 60 PSI the small "dip" in current consistently happens at 0.3 seconds, and then increases (for example, to 0.4 seconds and then 0.5 seconds), it can be determined that there is an error or fault. If the system does not recognize the small "dip" in current, it can be determined that the plunger did not move and is therefore stuck, or that the solenoid windings in the coil have failed, and that service or replacement is required.

Figure 5:
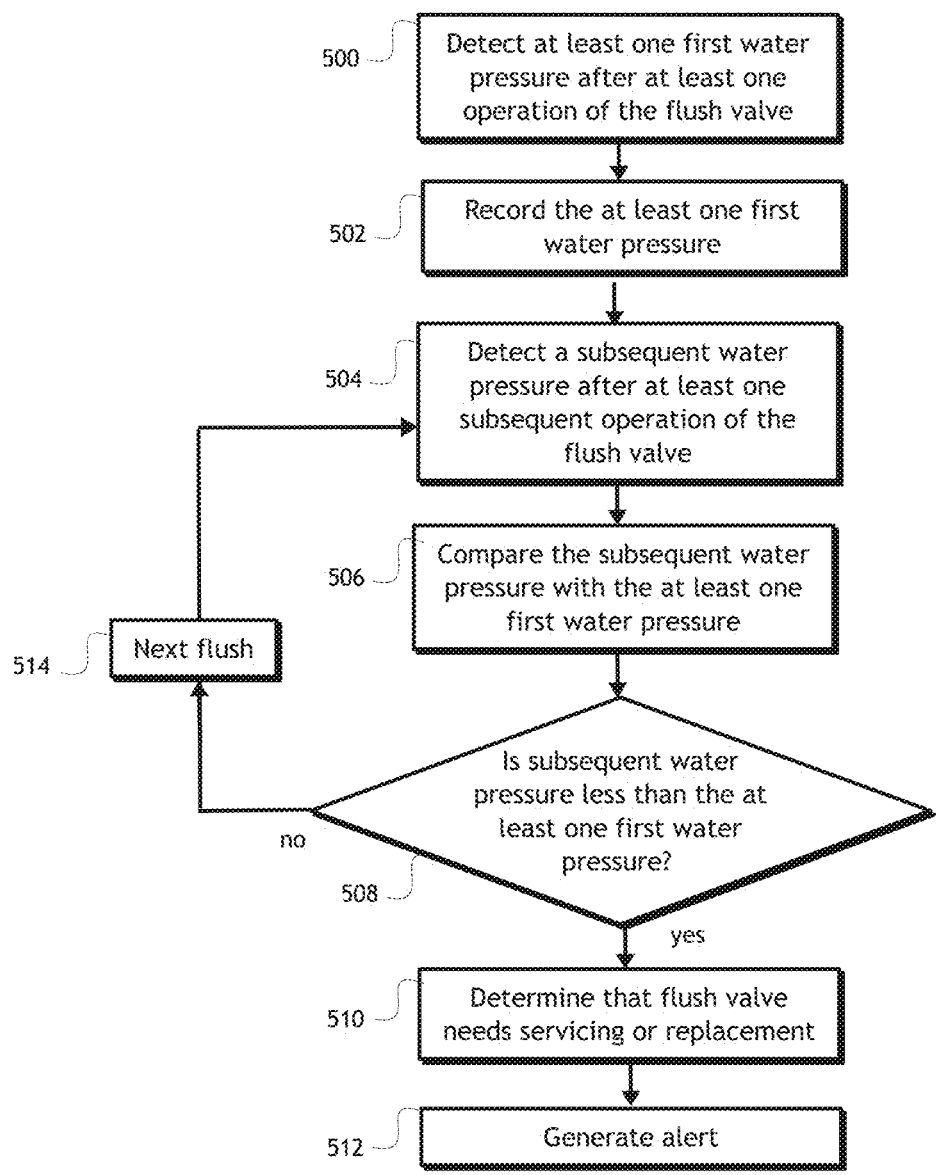
FIG. 5 is flow diagram for another method of monitoring wear in a flush valve according to the principles of the present invention.

Referring now to FIG. 5, a method for determining that a flush valve needs to be serviced or replaced is shown according to another non-limiting embodiment. At a first step 500, the at least one first water pressure is detected after at least one operation of the flush valve. For example, this step may entail detecting a single water pressure at a time period following operation of the flush valve or detecting a series of water pressures following a series of operations of the flush valve. The one or more water pressures are stored in memory at a second step 502. At a third step 504, a subsequent water pressure is detected after a subsequent operation of the flush valve. For example, the subsequent operation may be the next operation following the operation(s) in step 500, or may be otherwise subsequent to the operation(s) in step 500. At a next step 506, the subsequent water pressure is compared to the at least one first water pressure that was stored in memory at step 502. This step 506 may entail comparing the subsequent water pressure to a previous water pressure, comparing the subsequent water pressure to an average of previous water pressures, and/or the like. In some examples, the previous water pressure recorded at step 502 may immediately precede the subsequent operation of the flush valve and, in other examples, the previous water pressure(s) recorded at step 502 may be from an earlier operation of the flush valve. Various other arrangements are possible.

With continued reference to FIG. 5, at a next step 508, it is determined whether the subsequent water pressure detected is less than the at least one first water pressure previously detected and recorded. This step 508 may, in some examples, entail determining if the subsequent water pressure is less than the at least one first water pressure, or if the difference in pressure exceeds a predefined threshold. For example, if the predefined difference is 5 PSI, the subsequent water pressure is 58 PSI, and the previous water pressure (or average of previous water pressures) is 60 PSI, the difference between the subsequent water pressure and the previous water pressure is within the 5 PSI threshold and it may therefore be determined that the flush valve is not faulty. However, it will be appreciated that, in other examples, a predefined difference may not be factored into the determination and any water pressure less than a previous water pressure may be enough to determine that the flush valve is faulty. Accordingly, if it is determined that the subsequent water pressure is less than one or more previous water pressures (or if the difference exceeds a predefined threshold), the method may proceed to step 510 at which it is determined that the flush valve needs servicing or replacement. At step 512, an alert may be generated and/or transmitted to a remote device indicating that the flush valve needs servicing or replacement. If, at step 508, the water pressure is not less than one or more previous water pressures (or if the difference is less than a threshold), the method may continue through the next flush 514 and repeat from step 504. In this example, the subsequent water pressure may become a previous water pressure, and a new subsequent water pressure may be detected for the next operation of the flush valve. Other variations are possible.

Figure 6:
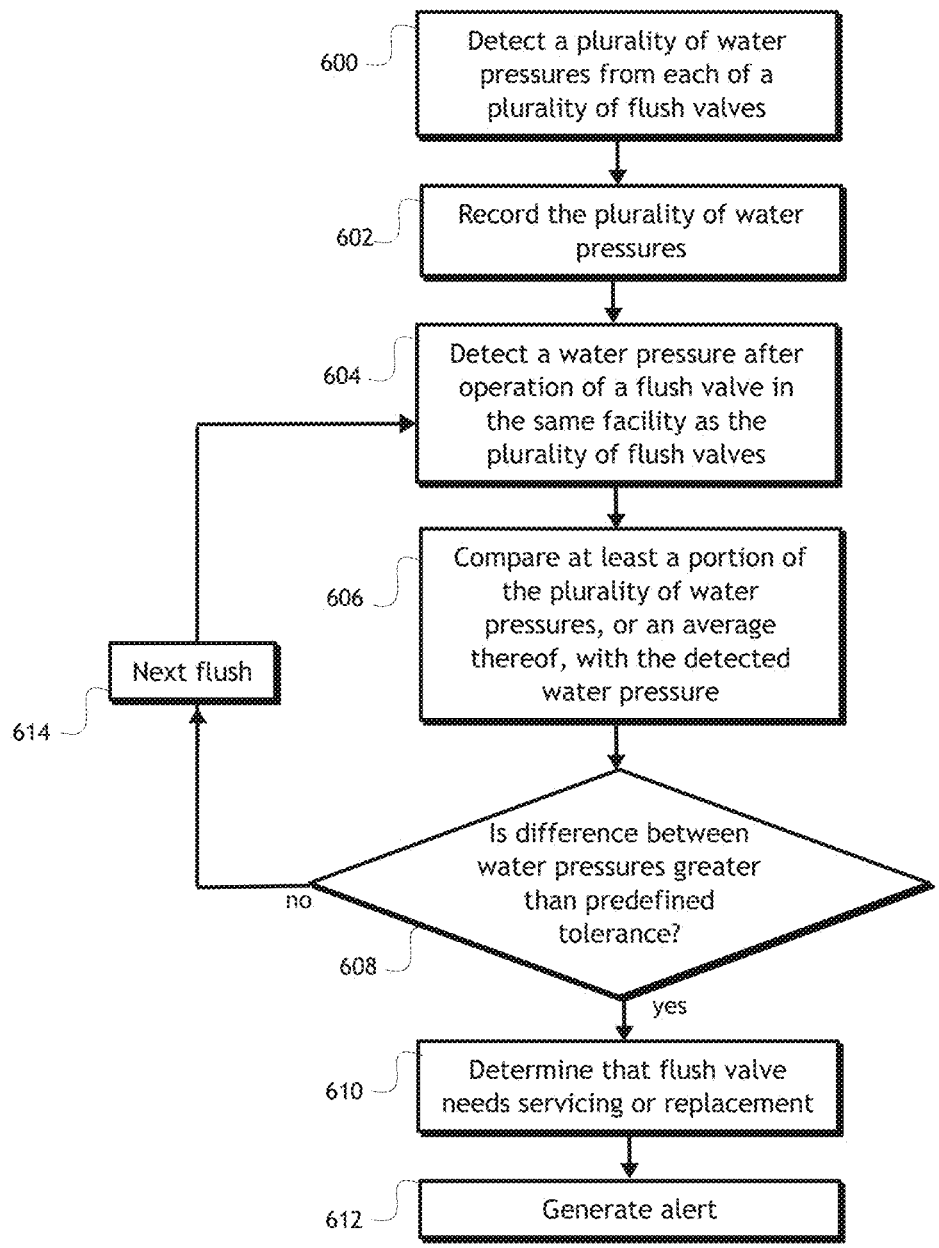
FIG. 6 is another flow diagram for a further method of monitoring wear in a flush valve according to the principles of the present invention.

Referring now to FIG. 6, a method for determining that a flush valve needs to be serviced or replaced is shown according to a further non-limiting embodiment. At a first step 600, a plurality of water pressures are detected from each of a plurality of flush valves. The plurality of flush valves, for example, may be installed in a common facility. The plurality of water pressures are recorded in memory at a next step 602. At step 604, a water pressure of a flush valve in the facility is detected at a time following operation of the valve. At a next step 606, the detected water pressure is compared to one or more of the plurality of water pressures detected in step 600. The comparison of the water pressures may result in a difference between the water pressures. In some examples, an average of the plurality of water pressures may be used for comparison and, in other examples, one or more water pressures of the plurality may be used. At step 608, it is determined if the difference between the detected water pressure and the water pressure(s) is greater than a predefined threshold value. If the difference is greater, the method may proceed to step 610 at which it is determined that the flush valve needs servicing or replacement. At step 612, an alert may be generated and/or transmitted to a remote device indicating that the flush valve needs servicing or replacement. If, at step 608, the water pressure is not less than one or more previous water pressures (or if the difference is less than a predefined threshold), the method may continue through the next flush 614 and repeat from step 604.

Figure 7:
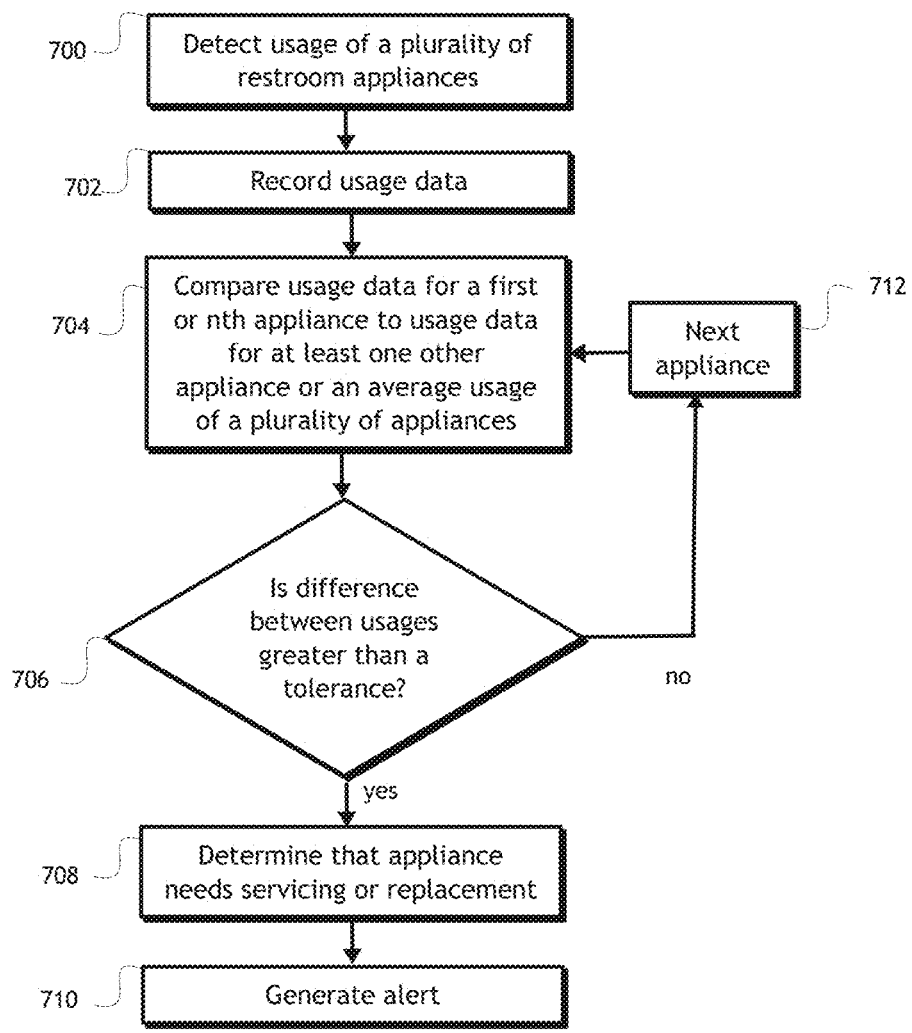
FIG. 7 is a further flow diagram for a method of monitoring restroom appliances according to the principles of the present invention.

Referring now to FIG. 7, a method for determining that a flush valve needs to be serviced or replaced is shown according to another non-limiting embodiment. At a first step 700, usages of a plurality of restroom appliances are detected with one or more sensors associated with each appliance. A usage may be, for example, a flush, a dispensing of a paper towel or soap, an opening of a faucet, and/or the like. At step 702, the usage data for the appliances is stored in a central data storage device and/or memory local to the appliance. It will be appreciated that usage data may be immediately transmitted from an appliance upon a usage event or, in other examples, appliances may periodically communicate usage data for a time period. Further, in non-limiting embodiments, usage of a restroom appliance may also be detected with one or more sensors external to the appliance, such as a sensor that detects a change in pressure in a waterline attributable to an appliance or a set of appliances. At a next step 704, the usage data for a restroom appliance is compared to usage data from at least one other restroom appliance. For example, it may be determined whether a number of uses for a restroom appliance in a time period is less than the number of uses of a nearby appliance or an average or median number of uses of a plurality of appliances.

With continued reference to FIG. 7, at a next step 706, it is determined whether the difference in usage data is greater than (or equal to) a predetermined tolerance value (e.g., n number of uses or n percent) to distinguish between a small difference in usages and a significant difference in usage. If the difference is greater than (or equal to) a predetermined tolerance value, the method proceeds to step 708 where it is determined that the restroom appliance needs servicing or replacement. At step 710, an alert is generated to inform the appropriate personnel that the restroom appliance needs to be serviced or replaced. If, at step 706, it is determined that the difference in usage data is less than a predetermined tolerance value, and therefore not significant enough to cause any concern, the method proceeds to the next restroom appliance at step 712 and restarts at step 704 with that next appliance.

Figure 8:
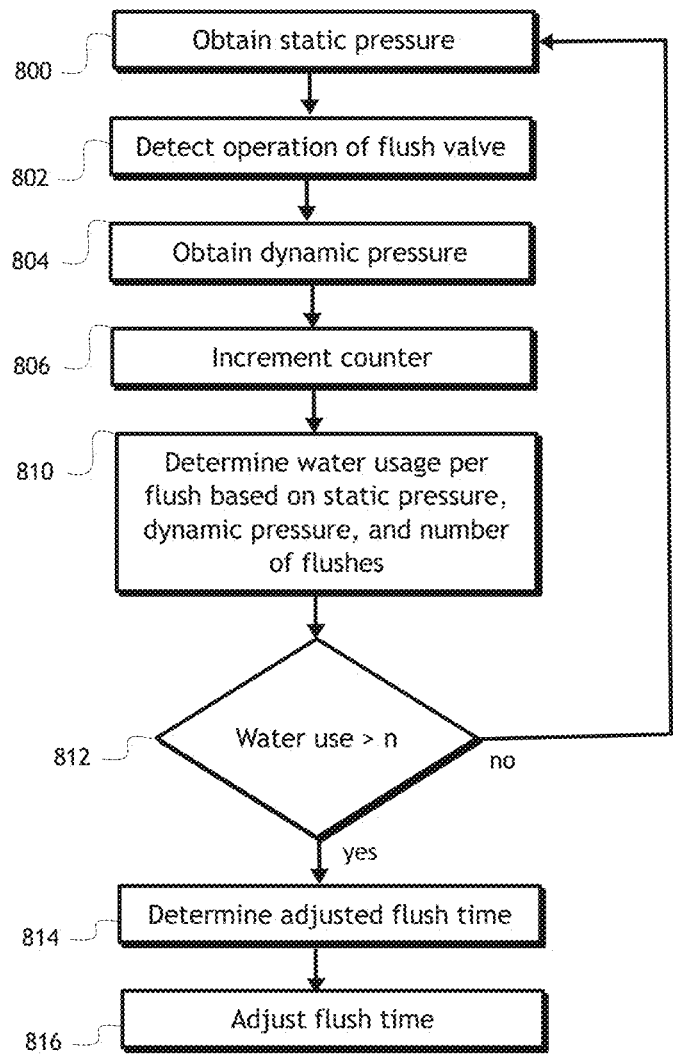
FIG. 8 is a flow diagram for a method of adjusting a flush time on a flush valve according to the principles of the present invention.

Referring now to FIG. 8, a method for adjusting a flush time of a flush valve is shown according to a preferred and non-limiting embodiment. At a first step 800, a static pressure is obtained when the flush valve is not being operated. The static pressure may be obtained before a flush or at a predetermined time following completion of a flush. The static pressure may be obtained by one or more pressure sensors disposed in or associated with the flush valve. At step 802, operation of the flush valve is detected by, for example, actuation of a flush actuator, activation of a hands-free signal, and/or the like. During the flush, a dynamic flush valve pressure is obtained at step 804. The dynamic flush valve pressure may be obtained immediately following the flush operation or at a predefined interval from detection of a flush operation. At step 806, a programmatic counter is incremented to count the number of times the flush valve has been used. This counter may represent a number of flushes over a given time period and may be reset when the flush valve is repaired or replaced. At step 810, the controller determines a volume of water being used during a flush operation. This determination may be based on a number of parameters including, but not limited to, the static pressure, dynamic pressure, flow area of the flush valve, number of flushes, a flow meter measuring the water volume, and/or the like.

As the flush valve is used, the amount of water volume used may increase. Thus, in one non-limiting example, a model may be employed to determine that, for a particular flush valve, x number of uses (e.g., 1,000) typically results in a y increase in volume (e.g., 0.1 gallons). It will be appreciated that different types of valves, available water pressure, and types of use may all factor into determining how much water is used per flush. Referring back to FIG. 8, at step 812 it is determined whether the amount of water used per flush exceeds a threshold value n. For example, the threshold may be a predefined tolerance from a typical volume of water usage (e.g., 1.6 gallons per flush) such that any difference equal to or greater than, for example, 0.1 gallons or another tolerance, may be significant enough to warrant adjusting the flush time. Once it is determined that the water usage is more than this threshold and/or tolerance, the method proceeds to step 814 where an adjusted flush time is determined. The adjusted flush time may be based on a number of parameters such as, for example, a volume of water used during a flush, a flow area of the flush valve, a number of uses of the flush valve, one or more pressures (e.g., static and/or dynamic pressure) obtained from within the valve, or other factors. It will also be appreciated that the adjusted flush time may be predefined incremental changes based on water usage. For example, for every 0.1 gallons of excess water usage, the flush time may be decreased by 0.5 seconds. It will be appreciated that the adjusted flush time may be determined in various other ways. At step 816, the controller adjusts the flush time of the flush valve.

Figure 9:
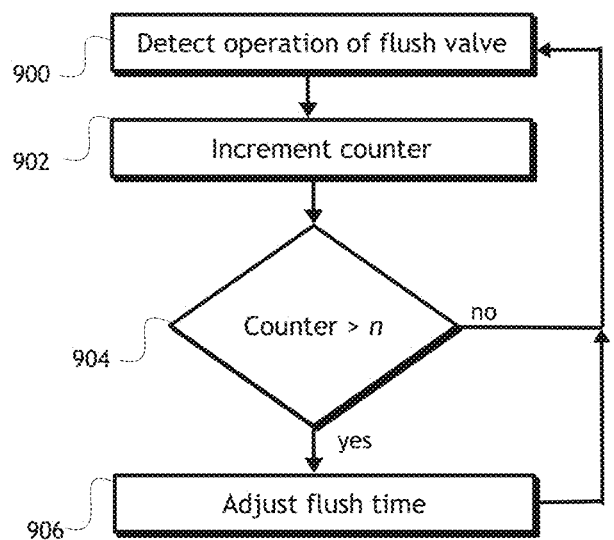
FIG. 9 is another flow diagram for a method of adjusting a flush time on a flush valve according to the principles of the present invention.

Referring now to FIG. 9, a method for adjusting a flush time of a flush valve is shown according to another non-limiting embodiment. In this example, the number of uses of the flush valve is correlated to a change in flush time. At step 900, operation of the flush valve is detected. A programmatic counter is incremented at step 902. At step 904 the controller determines whether the counter has reached a predefined value, e.g., n. If the counter equals or exceeds this value, the method may proceed to step 906 and the flush time may be adjusted based on a predefined incremental change (e.g., 0.5 seconds for every 1,000 uses) or on a dynamically determined flush time based on other factors such as, but not limited to, the number of uses, one or more internal pressures, the flow area of the valve, a flow meter, and/or the like.

Figure 10A:
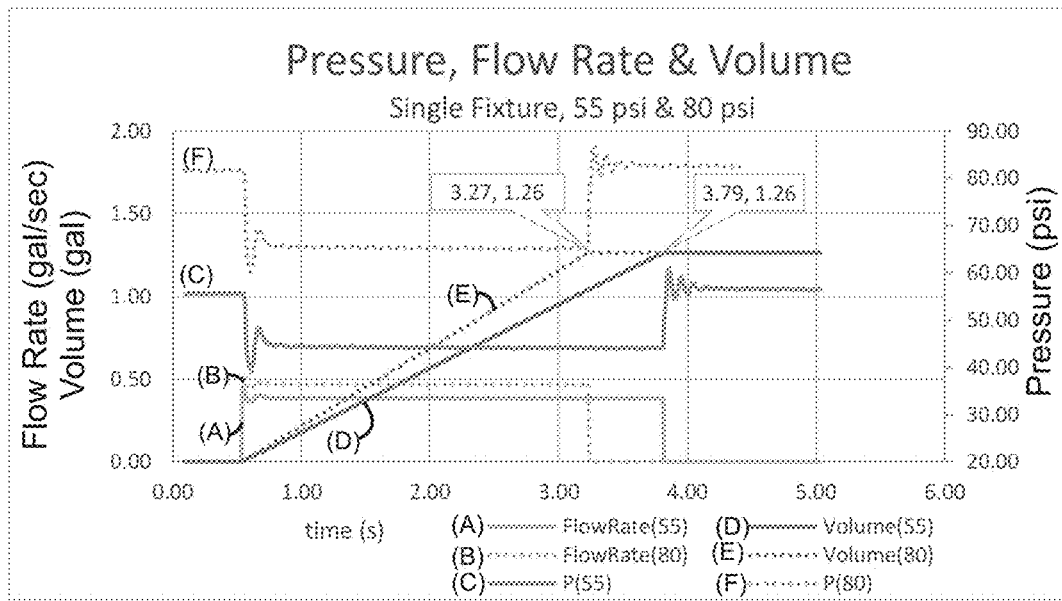
FIG. 10A-10C are charts illustrating the relationship between pressure, flow rate, flush volume, and flush time for flush valves.
Figure 10B:
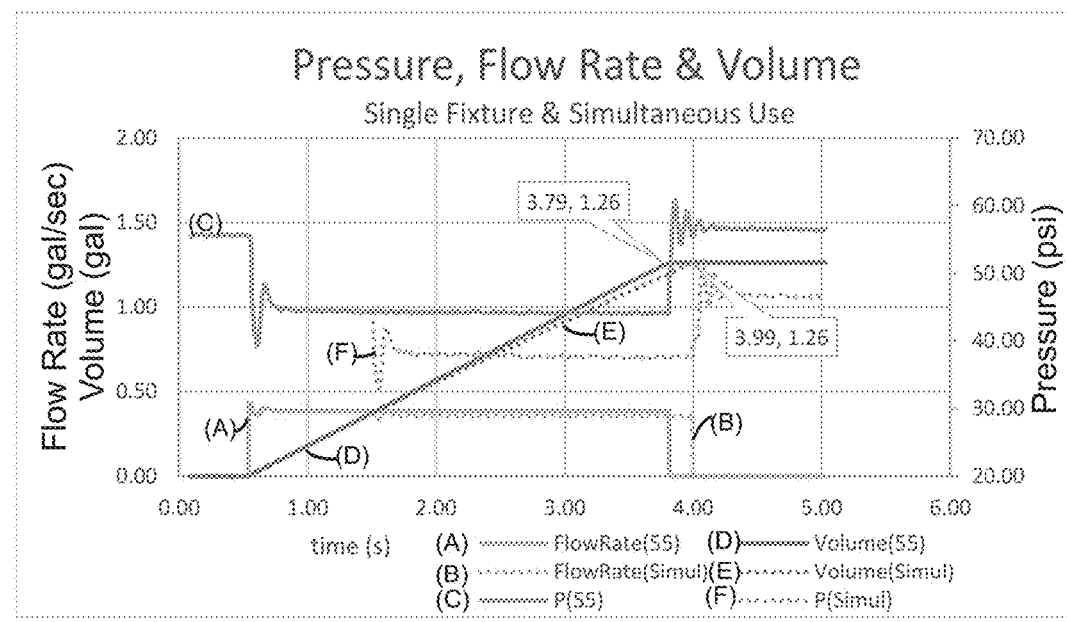
Figure 10C:
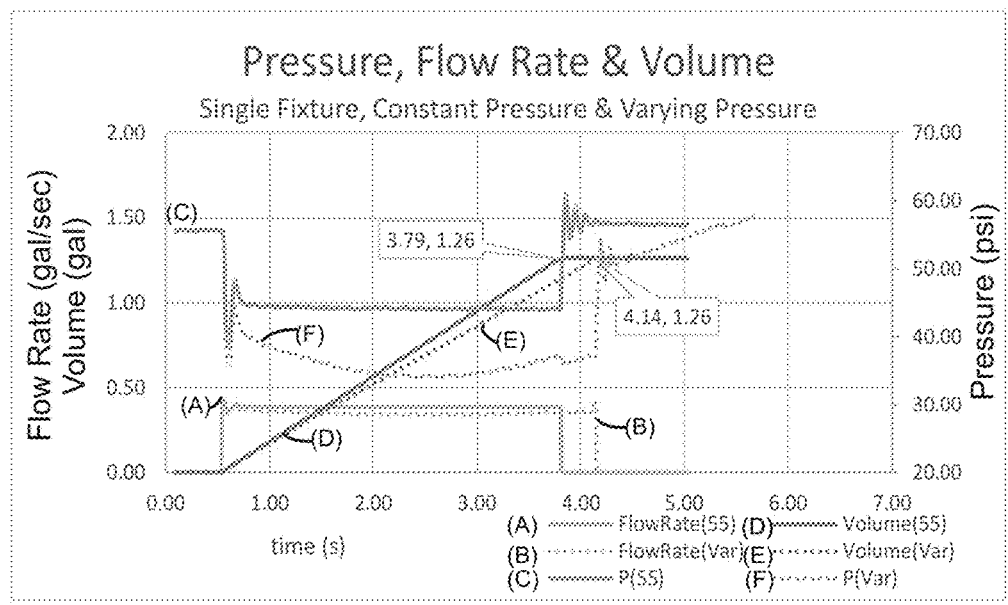

Referring now to FIGS. 10A-10C, charts are shown according to non-limiting embodiments. The charts in FIGS. 10A-10C represent changes in flow rate, pressure, and volume over a flush time period for valves with differing pressures. The curves shown in the charts represent the relationship between pressure, flow rate, and volume over a flush time, and can be used to compare to operational flush valves to determine when the flush valves need to be replaced or repaired or by what amount pressure and/or flush time need to be adjusted to obtain an optimal flush volume. The curves in FIG. 10A are for constant pressure valves, where curve (A) represents a flow rate for a single fixture valve at 55 psi, curve (B) represents a flow rate for a single fixture valve at 80 psi, curve (C) represents a change in pressure for a single fixture valve at 55 psi, curve (D) represents a volume for a single fixture valve at 55 psi, curve (E) represents a volume for a single fixture valve at 80 psi, and curve (F) represents a change in pressure for a single fixture valve at 80 psi. As can be seen in FIG. 10A, at 3.27 seconds, the 80 psi fixture (curve (E)) has used 1.26 gallons of water, where the volume is represented by the area under the curve. At 3.79 seconds, the 55 psi fixture (curve (D)) has also used the same volume of water (1.26 gallons).

The curves shown in FIG. 10B are for constant pressure valves operating substantially simultaneously, where curve (A) represents a flow rate for a single fixture valve at 55 psi, curve (B) represents a flow rate for a single fixture valve at 55 psi operating substantially simultaneously to the valve represented by curve (A), curve (C) represents a change in pressure for a single fixture valve at 55 psi, curve (D) represents a volume for a single fixture valve at 55 psi, curve (E) represents a volume for a single fixture valve at 55 psi operating substantially simultaneously to the valve represented by curve (A), and curve (F) represents a change in pressure for a single fixture valve at 55 psi operating substantially simultaneously to the valve represented by curve (A). As can be seen in FIG. 10B, the volumes for both valves are substantially correlated until the first valve (curve (D)) is almost finished flushing. Thus, to reach the same flush volume of 1.26 gallons, the second flush valve takes 3.99 seconds versus the 3.79 seconds it takes the first flush valve. Comparing curves (C) and (F) indicates that flushing the first valve (pressure represented by curve (C)) causes the pressure available to the second valve (pressure represented by curve (F)) to drop, thereby taking a longer period of time to complete the flush.

The curves shown in FIG. 10C are for constant pressure and variable pressure valves, where curve (A) represents a flow rate for a single fixture valve at 55 psi, curve (B) represents a flow rate for a single fixture valve operating at a variable pressure, curve (C) represents a change in pressure for a single fixture valve at 55 psi, curve (D) represents a volume for a single fixture valve at 55 psi, curve (E) represents a volume for a single fixture valve operating at a variable pressure, and curve (F) represents the change in pressure for a single fixture valve operating at a variable pressure. As can be seen by curve (D) in FIG. 10C, it takes 3.79 seconds for the valve operating at 55 psi to flush 1.26 gallons of water. Conversely, curve (D) shows that it takes 4.14 seconds to flush the same volume of water using a valve operating at a variable pressure.

In non-limiting embodiments, and as mentioned herein, restroom appliance data may include information sensed and/or collected by an appliance concerning the environment in which an appliance is installed. As an example, some restroom appliances may be powered by a battery and the restroom appliance data may be used to conserve battery power. In non-limiting embodiments, a restroom appliance (e.g., a flush valve, a paper towel dispenser, a hand dryer, a soap dispenser, a faucet, and/or the like) may include an infrared (IR) sensor for hands-free activation. In such embodiments, frequent pulses of the IR sensor may drain the battery. Therefore, ambient light levels detected by a sensor in the appliance or a sensor in the vicinity of the appliance may be used to determine if the lights are on or off and, if the lights are off, the frequency of IR pulses can be decreased or even stopped to conserve battery power. Conversely, in non-limiting embodiments, detection of the lights being on may activate (e.g., "wake up") the appliances. It will be appreciated that the appliances may also be configured to enter a sleep mode in such circumstances, which may include reducing the frequency of IR pulses and/or other energy saving functions. Moreover, because the appliances can exchange data with one another, if one appliance detects that the lights are off, the other appliances can react by reducing the pulse frequency of the IR sensor. If an appliance is activated from use, one or more signals may be sent to the other appliances in the restroom to activate those appliances as well. It will be appreciated that these techniques may be used for other types of sensors that consume energy including, for example, capacitive sensors, by either reducing the frequency of the sensors or reducing the amount of energy supplied to the sensors.

In non-limiting embodiments, IR sensors or other proximity sensors may be used to adjust the amount of water used during a flush. For example, a sensor can be used to determine if a person is standing in front of a toilet or sitting on the toilet based on the proximity of that person to the appliance. If the person is determined to be standing, it can be assumed that the person is urinating and less water may be used during a flush. Other types of restroom appliance data may also be used to adjust the amount of water used during a flush. For example, a frequency of urinal flushes may be used to adjust the water so that, when a restroom is busier than usual, less water is used. The decrease in water usage may be based at least partially on the frequency of use, or alternatively there may be multiple modes of usage based on the frequency of use. This could be used in a stadium or other event venue, as an example, where restrooms are busy during events and less busy at other times. In another non-limiting embodiment, the system may include a network device in the restroom or in the vicinity of the restroom that is programmed or configured to detect peoples' cellular phones or other mobile devices. In such examples, the network device may detect signals from the devices that are searching for Wi-Fi networks or Bluetooth® devices, as examples, to determine the number of people with mobile devices in the restroom. The water usage may therefore be decreased if the number of people in the restroom meet or exceed a predetermined threshold. It will be appreciated that various other signals emitted from a mobile device may be used and, in some examples, that the network device may send one or more signals to activate and detect passive mobile devices that are not actively emitting signals.

It will be readily appreciated by those skilled in the art that modifications may be made to the invention without departing from the concepts disclosed in the foregoing description. For example, various components of the mechanical and electronic relief devices described above can be used together in the same valve. Accordingly, the particular embodiments described in detail herein are illustrative only and are not limiting to the scope of the invention, which is to be given the full breadth of the appended claims and any and all equivalents thereof.

The invention claimed is:

1. A system for optimizing a timing of a flush valve to provide a consistent flush volume, comprising:
   (a) a flush valve comprising a flow area and a solenoid configured to open the flush valve;
   (b) at least one pressure sensor configured to measure a pressure in the flush valve; and (c) at least one controller in communication with the at least one pressure sensor and the solenoid, the at least one controller programmed or configured to:
  (i) control the solenoid to open the flush valve for a flush time in response to a flush request;
  (ii) measure a pressure in the flush valve to obtain at least one flush valve pressure;
  (iii) adjust the flush time based at least on the at least one flush valve pressure and a number of uses of the flush valve, resulting in an adjusted flush time;
  (iv) control the solenoid to perform a flush by opening the flush valve for the adjusted flush time in response to a next flush request; and
  (v) increment a counter for each flush, wherein the number of uses of the flush valve is based on the counter.

2. The system of claim 1, wherein the at least one controller measures the pressure in the flush valve to obtain the at least one flush valve pressure by obtaining at least one static pressure prior to a flush of the flush valve and at least one dynamic pressure during a flush of the flush valve.

3. The system of claim 2, wherein the flush time is adjusted to the adjusted flush time based at least on the at least one static pressure, the at least one dynamic pressure, and the flow area of the flush valve.

4. The system of claim 1, wherein the adjusted flush time is less than the flush time to provide a consistent flush after the flow area of the flush valve has worn with usage.

5. The system of claim 1, wherein the at least one controller is further programmed or configured to:
  determine a water volume usage per flush; and
  determine the adjusted flush time based at least partially on the water volume usage per flush.

6. The system of claim 5, wherein the water volume usage per flush is based at least on the at least one flush valve pressure and a number of uses of the flush valve.

7. A flush valve controller for optimizing a timing of a flush valve to provide a consistent flush volume, the flush valve controller configured to execute program instructions stored thereon or in communication therewith that cause the flush valve controller to:
  receive, from a pressure sensor disposed in the flush valve, at least one flush valve pressure within the flush valve;
  control a solenoid disposed in the flush valve to cause the flush valve to open for a flush time;
  adjust the flush time based at least on the at least one flush valve pressure and a number of uses of the flush valve, resulting in an adjusted flush time;
  control the solenoid disposed in the flush valve to perform a flush by causing the flush valve to open for the adjusted flush time in response to a next flush request; and
  increment a counter for each flush, wherein the number of uses of the flush valve is based on the counter.

8. The flush valve controller of claim 7, wherein the flush valve controller is further programmed or configured to:
  determine a water volume usage per flush; and
  determine the adjusted flush time based at least partially on the water volume usage per flush.

9. The flush valve controller of claim 8, wherein the water volume usage per flush is determined based at least on the at least one flush valve pressure and a number of uses of the flush valve.

10. The flush valve controller of claim 7, wherein the at least one flush valve pressure within the flush valve received from the pressure sensor comprises at least one static pressure prior to a flush of the flush valve and at least one dynamic pressure during the flush of the flush valve.

11. The flush valve controller of claim 10, wherein the flush time is adjusted to the adjusted flush time based at least on the at least one static pressure, the at least one dynamic pressure, and a flow area of the flush valve.

12. The flush valve controller of claim 7, wherein the flush valve controller comprises at least one controller disposed in the flush valve or at least one central controller in communication with a plurality of flush valves, and wherein the flush valve controller is further programmed or configured to store the at least one flush valve pressure in at least one data storage device.

13. A method for optimizing a timing of a flush valve to provide a consistent flush volume, the flush valve comprising a flow area, a solenoid configured to open the flush valve to provide a flush through the flow area, and at least one pressure sensor arranged in the flush valve, comprising:
  measuring at least one flush valve pressure within the flush valve from data received from the at least one pressure sensor;
  controlling the solenoid to cause the flush valve to open for a flush time;
  adjusting a first flush time based at least on the at least one flush valve pressure and a number of uses of the flush valve, resulting in an adjusted flush time;
  controlling the solenoid to cause the flush valve to flush by opening the flush valve for the adjusted flush time in response to a next flush request; and
  incrementing a counter for each flush, wherein the number of uses of the flush valve is based on the counter.

14. The method of claim 13, wherein measuring the at least one flush valve pressure comprises obtaining, from the at least one pressure sensor, at least one static pressure prior to a flush of the flush valve and at least one dynamic pressure during a flush of the flush valve.

15. The method of claim 14, wherein the flush time is adjusted to the adjusted flush time based at least on the at least one static pressure, the at least one dynamic pressure, and the flow area of the flush valve.

16. The method of claim 13, further comprising: determining a water volume per usage of the at least one flush valve; and determining the adjusted flush time based at least on the water volume per usage.

* * * * *